United States Patent [19]

Chikamasa et al.

[11] Patent Number: 4,840,818
[45] Date of Patent: Jun. 20, 1989

[54] METHOD OF MAKING MAGNETIC RECORDING MEDIUM

[75] Inventors: Hiroshi Chikamasa; Masaaki Utsui; Yasutami Nojiri, all of Kanagawa, Japan

[73] Assignee: Fuji Photo Film Co., Ltd., Japan

[21] Appl. No.: 34,975

[22] Filed: Apr. 6, 1987

[30] Foreign Application Priority Data

Apr. 4, 1986 [JP] Japan .................................. 61-77596

[51] Int. Cl.4 .............................................. B05D 5/12
[52] U.S. Cl. .................................... 427/130; 427/128; 428/695; 428/900
[58] Field of Search ................................ 427/128–132, 427/48; 428/694, 900

[56] References Cited

U.S. PATENT DOCUMENTS 3,398,011 8/1968 Neirotti et al. ................... 117/65.2
4,557,947 12/1985 Deimling et al. ................... 427/130

Primary Examiner—Bernard Pianalto
Attorney, Agent, or Firm—Sughrue, Mion, Zinn, Macpeak & Seas

[57] ABSTRACT

A method of making a magnetic recording medium by forming a recording layer composed of a ferromagnetic material on a strip-like substrate comprises a first step of applying the ferromagnetic material onto the surface of the substrate, a second step of drying the ferromagnetic material applied on the surface of the substrate, a third step of grinding the surface of the dried recording layer on the substrate, a fourth step of removing process grains clinging to the ground surface of the recording layer, and a fifth step of calendering the surface of the recording layer from which the process grains have been removed.

6 Claims, 1 Drawing Sheet

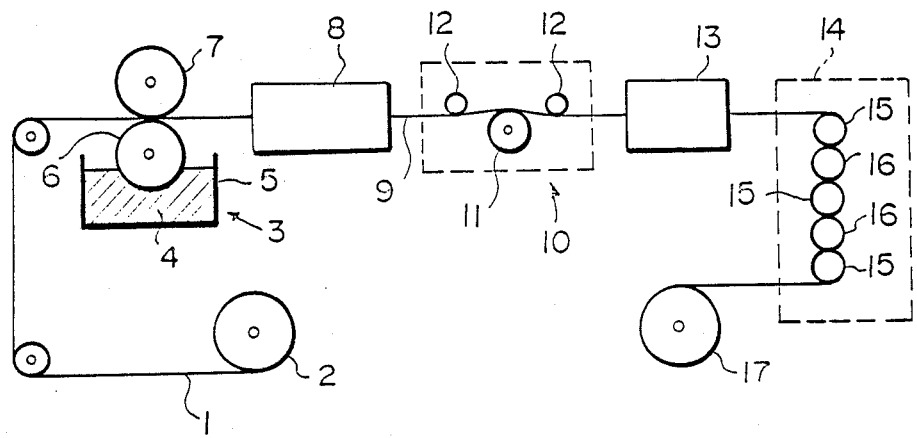

METHOD OF MAKING MAGNETIC RECORDING MEDIUM

BACKGROUND OF THE INVENTION

1. Field of the Invention

This invention relates to a method of making a magnetic recording medium such as a magnetic tape. This invention particularly relates to a method of making a magnetic recording medium, wherein press processing (hereinafter referred to as calendering) is carried out efficiently.

2. Description of the Prior Art

In general, magnetic recording media (hereinafter referred to as magnetic tapes) used for video tape recorders or the like are subjected to surface processing, which is called calendering, for the purpose of improving their electromagnetic transducing characteristics. Calendering is carried out by alternately disposing a plurality of metal rolls and resilient rolls or disposing only the metal rolls, moving a magnetic tape comprising a substrate and a recording layer formed of a ferromagnetic material and overlaid on the surface of the substrate between the rolls, and thus pressing the magnetic tape at a predetermined temperature under a predetermined pressure, thereby to smooth the surface of the magnetic tape and improving the packing density of the recording layer.

However, when the magnetic tape is subjected to calendering just after the ferromagnetic material is applied and dried, protrusions on the surface of the recording layer become separated as magnetic grains. Thus chipping occurs in the course of calendering. As a result, the surfaces of the calender rolls composed of the metal rolls and the resilient rolls are roughened by chipping, and the calendering effects are deteriorated. In addition, dents can occur on the surface of the recording layer and cause the recording layer to peel off from the magnetic tape thereby creating drop-out. Also, it takes a long time to repair surfaces of the calender rolls which have been roughed by chipping, i.e., to make such surfaces smooth again and therefore the productivity becomes low.

SUMMARY OF THE INVENTION

The primary object of the present invention is to provide a method of making a magnetic recording medium, wherein chipping of the magnetic recording medium in the course of calendering is prevented.

Another object of the present invention is to provide a method of making a magnetic recording medium, which efficiently carries out calendering of the surface of the magnetic recording medium.

The present invention provides a method of making a magnetic recording medium by forming a recording layer composed of a ferromagnetic material on a strip-like substrate, the method of making a magnetic recording medium comprising:

(i) a first step of applying said ferromagnetic material onto the surface of said substrate, (ii) a second step of drying said ferromagnetic material applied on the surface of said substrate, (iii) a third step of grinding the surface of the dried recording layer on said substrate, (iv) a fourth step of removing process grains clinging to the ground surface of said recording layer, and (v) a fifth step of press processing the surface of said recording layer from the process grains have been removed.

With the method of making a magnetic recording medium in accordance with the present invention, end portions of the protrusions which give rise to grains separated from the surface of the recording layer of the magnetic tape are cut prior to calendering, the process grains and dust are removed from the surface of the recording layer, and thereafter calendering of the magnetic tape is carried out. Therefore, no grains fall from the surface of the magnetic tape in the course of calendering, and the surfaces of the calender rolls are prevented from being roughened. As a result, it becomes possible to carry out calendering efficiently.

BRIEF DESCRIPTION OF THE DRAWING

The single drawing is a schematic view showing an embodiment of the method of making a magnetic recording medium in accordance with the present invention.

DESCRIPTION OF THE PREFERRED EMBODIMENTS

The present invention will hereinbelow be described in further detail with reference to the accompanying drawing.

Referring to the drawing, a strip-like substrate 1 formed of a polyester film or the like is fed from a feed roll 2, and a ferromagnetic material 4 is applied to the substrate 1 to form a recording layer at a coating section 3. The coating section 3 comprises a vessel 5 containing the ferromagnetic material 4 in a liquid, which contains magnetic iron oxide as the main constituent, a gravure roll 6 whose surface is provided with gravure-like mesh dimples, the lower section of the gravure roll 6 being dipped in the ferromagnetic material 4 in the vessel 5, and a back-up roll 7 for grasping the substrate 1 in cooperation with the gravure roll 6. The substrate 1 is grasped between the rolls 6 and 7, and a recording layer composed of the ferromagnetic material 4 is formed on the surface of the substrate 1 as the rolls 6 and 7 grasping the substrate 1 therebetween are rotated. The substrate 1 thus provided with the recording layer is sent to a drying section 8 where the recording layer on the substrate 1 is dried. The substrate 1 provided with the recording layer and dried at the drying section 8 to form a magnetic tape 9 is sent to a grinding section 10. At the grinding section 10, the surface of the recording layer formed on the magnetic tape 9 is ground, and end portions of protrusions on the surface of the recording layer which give rise to grains separated from the surface of the magnetic tape 9 are cut off. The grinding process may be carried out by any known method, for example, a method using an abrasive tape as disclosed in Japanese Unexamined Patent Publication No. 60(1985)-151838, or a method as disclosed in Japanese Unexamined Patent Publication No. 50(1975)-82692 wherein an abrasive roll formed of a porous member and capable of cutting a material is used. Alternatively, a cutting blade may be used for this purpose. In this embodiment, an abrasive roll 11 made by shaping a composition containing diamond grains and a synthetic resin into a roll form is used. The magnetic tape 9 is made to contact the abrasive roll 11 by guide rolls 12, 12, and the abrasive roll 11 is rotated at a high speed to grind the surface of the magnetic tape 9. The wrapping angle at which the magnetic tape 9 is made to contact the surface of the abrasive roll 11 is adjustable, and the rotation direction of the abrasive roll 11 may be identical with the advancing direction of the magnetic tape 9 or may be reverse to the advancing direction thereof.

The magnetic tape 9 having the surface ground as mentioned above is sent to a dust removing section 13, at which process grains and dust clinging to the surface of the magnetic tape 9 in the course of the grinding process are removed from the magnetic tape 9. As ways for dust removal, there have heretofore been known a dry removal method as disclosed in Japanese Unexamined Patent Publication No. 58(1983)-196626 wherein a nonwoven fabric is used, and a wet removal method as disclosed in Japanese Unexamined Patent Publication No. 59(1984)-150571. However, in this embodiment, the dry removal method as proposed in Japanese Patent Application No. 60(1985)-231094 wherein nonwoven fabric, e.g. Vilene made by Japan Vilene Co., Ltd., is used is employed. The magnetic tape 9 from which process grains and dust have been removed at the dust removing section 13 is sent to a calendering section 14. The calendering section 14 comprises metal rolls 15, 15, 15 alternately disposed with resilient rolls 16, 16. Calendering is carried out by moving the magnetic tape 9 between adjacent pairs of the metal rolls 15, 15, 15 and the resilient rolls 16, 16 so that the magnetic tape 9 is heated and pressed. Finally, the magnetic tape 9 is wound up around a wind-up roll 17.

Results of experiments carried out in accordance with the aforesaid embodiment are shown in Table 1. In the experiments, a substrate 1 having a thickness of 15 $\mu$m and a width of 500 mm was used, and grinding was carried out by rotating an abrasive roll 11 having a diameter of 100 mm in the normal direction and in the reverse direction. The calendering process was carried out by use of metal rolls and cotton rolls at a roll surface temperature of 60° C. and at a linear pressure of 200 kg/cm. Drop-out was measured by processing the coated substrate into $\frac{1}{2}$-inch tape-like shapes, and counting the number of drop-outs in which the level of the reproduced signal is lower than the average reproduction level by not less than 20dB for a period of 15 $\mu$ sec. or more when each of the tapes had been moved for one minute in a measuring machine.

TABLE 1

| | Abrasive roll | | | Result |
|---|---|---|---|---|
| | Material | Rotating direction | Rotation speed (m/min.) | Drop-out count |
| Example 1 | Diamond abrasive roll (I) Ra = 0.6 $\mu$m (cut off 0.25 mm) | Normal Normal Reverse Reverse | 10 20 5 10 | 4 5 3 1 |
| | Diamond abrasive roll (II) Ra = 0.2 $\mu$m (cut off 0.25 mm) | Normal Normal Reverse Reverse | 10 20 5 10 | 4 6 2 0 |
| Comparative Example 1 | | None | | 7 |

As is clear from Table 1, with the aforesaid embodiment, since end portions of protrusions giving rise to grains separated from the surface of the recording layer of the magnetic tape 9 are cut off prior to the calendering process, and the magnetic tape 9 is subjected to the calendering process after the process grains and dust are removed, no grains fall from the surface of the magnetic tape 9 in the course of the calendering process, and there is no risk of the surface of the calender rolls being roughened by grains and dust. As a result, it becomes possible to prevent the surface of the calender rolls from being dented, and to decrease drop-out of the recording layer. Also, the operation of repairing the surface of the calender rolls to make the surface smooth again is minimized, and it is possible to increase the productivity of the calendering process.

Though the aforesaid embodiment is described for the case where the recording layer composed of the ferromagnetic material 4 is formed on one surface of the substrate 1, the same effects can be achieved by the same configuration also when the recording layer is formed on both surfaces of the substrate 1. Also, though the steps are carried out consistently in the aforesaid embodiment, it is also possible to wind up the magnetic tape 9 after it passed through the drying section 8, and to subsequently carry out the calendering process by disposing the grinding section 10 and the dust removing section 13 as the subsequent processes. Alternatively, the magnetic tape 9 may be wound up just after it passes through the dust removing section 13, and may be subjected to calendering in the next step. Also, the configurations of the coating section 3, the grinding section 10, the dust removing section 13 and the calendering section 14 are not limited to those employed in the aforesaid embodiment, and any other configurations having equivalent effects may be employed.

We claim:

1. A method of making a magnetic recording medium by forming a recording layer composed of a ferromagnetic material on a strip-like substrate, the method of making a magnetic recording medium comprising:
   (i) a first step of applying said ferromagnetic material onto the surface of said substrate,
   (ii) a second step of drying said ferromagnetic material applied on the surface of said substrate,
   (iii) a third step of grinding the surface of the dried recording layer on said substrate, to remove portions of said recording layer protruding from said surface and create loose process grains on said surface,
   (iv) a fourth step of removing the loose process grains clinging to the ground surface of said recording layer, and
   (v) a fifth step of calendering the surface of said recording layer from which the loose process grains have been removed.

2. A method as defined in claim 1 wherein said third step is carried out by making the surface of said recording layer contact an abrasive roll by guide rolls, and rotating the abrasive roll at a high speed.

3. A method as defined in claim 1 wherein said fifth step is carried out by heating, and press processing by use of a plurality of metal rolls and a plurality of resilient rolls, which are disposed alternately.

4. A method as defined in claim 2, wherein said strip-like substrate having said dried recording layer thereon is transported in a first direction during said third step of grinding, and said abrasive roll is rotated in a direction such that a portion of the abrasive roll which contacts the surface of the dried recording layer is moving in a second direction opposite to said first direction.

5. A method as defined in claim 2, wherein said strip-like substrate having said dried recording layer thereon is transported in a first direction during said third step of grinding, and said abrasive roll is rotated in a direction such that a portion of the abrasive roll which contacts the surface of the dried recording layer is moving in a second direction which is substantially the same as said first direction.

6. A method as defined in claim 1, wherein said fifth step of calendering includes press processing which is carried out by using a plurality of metal rolls.

* * * * *